United States Patent [19]
Willett

[11] Patent Number: 5,895,668
[45] Date of Patent: Apr. 20, 1999

[54] DOUGH DIVIDER

[75] Inventor: Paul Eaton Willett, Narangba, Australia

[73] Assignee: Willett Versatile Equipment Pty. Ltd., Queensland, Australia

[21] Appl. No.: 08/945,217

[22] PCT Filed: Apr. 19, 1996

[86] PCT No.: PCT/AU96/00233

§ 371 Date: Oct. 17, 1997

§ 102(e) Date: Oct. 17, 1997

[87] PCT Pub. No.: WO96/32845

PCT Pub. Date: Oct. 24, 1996

[30] Foreign Application Priority Data

Apr. 19, 1995 [AU] Australia ................ PN-2511
Apr. 20, 1995 [AU] Australia ................ PN-2504
Aug. 25, 1995 [AU] Australia ................ PN-5032

[51] Int. Cl.⁶ ........................................ A21C 5/02
[52] U.S. Cl. ............. 425/148; 425/240; 425/241; 425/448; 425/449
[58] Field of Search ........................ 425/145, 147, 425/148, 165, 240, 241, 238, 258, 256, 448, 449

[56] References Cited

U.S. PATENT DOCUMENTS

| 4,634,026 | 1/1987 | Suay Puig et al. | 425/241 |
| 4,828,863 | 5/1989 | Aoki | 425/240 |
| 5,074,744 | 12/1991 | Nose et al. | 425/448 |
| 5,227,174 | 7/1993 | Konig | 425/147 |
| 5,441,342 | 8/1995 | Konig et al. | 366/76.7 |

FOREIGN PATENT DOCUMENTS

| 1540016 | 5/1977 | United Kingdom . |
| 93000523 | 3/1993 | WIPO . |

*Primary Examiner*—James P. Mackey
*Attorney, Agent, or Firm*—Mathews, Collins, Shepherd & Gould, P.A.

[57] ABSTRACT

A dough divider is operable within a mixer bowl to divide the dough into preset weights (e.g., for bread, loaves, buns). A pendulum assembly has a retractable divider to cut a charge of dough, which is compressed by a piston. The charge of dough is expelled into a scaling die cylinder and causes a scaling die piston to be retracted until a preset weight of dough is in the scaling die cylinder. As the divider moves out of alignment with the scaling die cylinder, any excess dough is cut off and the preset weight of dough is then expelled by the scaling die piston.

24 Claims, 9 Drawing Sheets

DOUGH DIVIDER

BACKGROUND OF THE INVENTION

1. Field of the Invention

This invention relates to an improved dough divider. The dough divider may be provided as an accessory of, or an attachment to, an existing dough mixer, or may be provided integrally with the dough mixer.

2. Prior Art

In medium to large bakeries, bread dough is produced by the following methods:

(A) Dough is mixed in a dough mixer, usually of the spiral beater type, where the dough is removed either by hand, by cutting it out of the bowl; or by removing the bowl, lifting the bowl several meters and inverting it to deposit the mixed dough into a chute or hopper of an automatic dough divider, where the dough is divided into portions. In some cases, the entire mixer is lifted and inverted to permit the dough to enter the divider hopper.

The divider works by means of a square or half-round piston drawing dough into a cavity by suction, the dough is then trapped in the cavity by a sliding knife blade. The trapped dough, which could weigh approximately two kilograms, is highly compressed and force into another cavity whereby as much air as possible is displaced from the dough. This pocket then moves away from the piston cutting off a set volume of dough, and because most of the air has been dispelled, the dough is therefore a set weight.

(B) In some instances, a pre-weighed large portion of dough is placed in one large cavity, whereby the dough is compressed by raising the platform on which it is placed, and the dough is then divided by means of a honeycomb arrangement of blades, thus cutting the dough into set portions. This machine is compact and relatively inexpensive to manufacture; however, dough portions still need to be pre-weighed, the dough must still be removed manually from the mixer before dividing, and the divider will only produce dough pieces weighing from 200–900 grams. As bread rolls require pieces weighing from 40 grams to 120 grams, a separate divider is required for rolls.

Typically, an automatic divider of the type discussed in (A) above, costs $AU30,000, while the dough divider of method (B) will typically cost approximately $AU12000–15000; and a divider for buns will cost a further $AU12000 approximately.

SUMMARY OF THE PRESENT INVENTION

The object of the present invention is to provide a dividing system on the dough mixer, so that dough is portioned off in the mixer bowl.

It is a preferred object to provide a dividing system which avoids the need for inverting the bowl (or the mixer) and avoids the need to remove dough manually from the bowl.

It is a further preferred object to provide a dividing system where the weight of the dough can be set for different bakery products, eg., bread loaves, buns, rolls, etc.

It is a further preferred object to provide a dividing system which may be provided as an attachment to existing dough mixers, or as an integral installation thereon.

Other preferred objects will become apparent from the following description.

In a first aspect, the present invention resides in a dough divider including:

a frame, locatable adjacent a mixing bowl of a dough mixer;

a first cylinder, hingedly mounted on the frame, for movement between a first position and a second position;

a reciprocating sleeve or tube in the first cylinder;

a first reciprocating piston in the sleeve or tube;

a divider body on the frame, extendable into at least a portion of the mixer bowl, having a curved face engageable with dough in the mixer bowl;

a second cylinder in the divider body, operably connected to the curved face; and a second reciprocating piston in the second cylinder, so arranged that:

in the first position, the first piston and the sleeve or tube are retracted and the first cylinder and/or the sleeve or tube receives a charge of dough from the curved face of the divider body as the mixing bowl rotates;

the sleeve or tube is advanced to cut the charge of dough from the remainder of the dough in the mixing bowl;

the first cylinder is moved to the second position and the charge of dough is transferred to the second cylinder by advancing the first piston;

a pre-set quantity of dough is ejected from the second cylinder by advancing the second piston.

In a second aspect, the present invention resides in a dough divider including:

a frame locatable adjacent a mixing bowl of a dough mixer;

a sub-frame or housing hingedly mounted on the frame, for movement between a first position and a second position;

a reciprocating sleeve or tube mounted in or on a guide means in or on the sub-frame or housing;

a first reciprocating piston in the sleeve or tube;

a divider body on the frame, extendable into at least a portion of the mixer bowl, having a curved face engageable with dough in the mixer bowl;

a second cylinder in the divider body, connected to the curved face; and a second reciprocating piston in the second cylinder, so arranged that:

in the first position of the sub-frame or housing, the first piston and the sleeve or tube are retracted and the sleeve or tube receives a charge of dough from the curved face of the divider body as the mixing bowl rotates;

the sleeve or tube is advanced to cut the charge of dough from the remainder of the dough in the mixing bowl;

the sub-frame or housing is moved to the second position and the charge of dough is transferred to the second cylinder by advancing the first piston;

a preset quantity of dough remains in the second cylinder as the sub-frame or housing returns to its first position; and the preset quantity of dough is ejected from the second cylinder by advancing the second piston.

The guide means may comprise bars, rods, rails, tracks, a first cylinder or the like to guide the sleeve or tube as it is advanced and retracted (relative to the divider body).

In third and fourth aspects, the present invention resides in a dough mixer incorporating the dough divider hereinbefore described in the first and second aspects, respectively.

In a fifth embodiment, the dough divider has its frame mounted on a wall, and the mixing bowl is transported (eg., on a trolley) to a location adjacent the frame, the mixing bowl being driven via, eg., friction drive means by a drive motor provided adjacent the frame. Locating spigots or pins, and complementary sockets or guides on the frame and the trolley locate the mixing bowl relative to the frame (and drive motor).

Preferably, the frame is mounted above the mixer bowl and may be raised vertically; swung to one side of the bowl; or swung upwardly and rearwardly of the bowl.

Preferably, as the first cylinder returns to the first position, a further charge of dough is drawn into the first cylinder by retraction of the first piston and the sleeve or tube.

Preferably, when the first cylinder is at the first position, the rotation of the mixer bowl is stopped.

Preferably, in the second position, the first cylinder will be aligned with the second cylinder and the advance of the first piston will transfer a quantity of dough from the first cylinder to the second cylinder causing the second piston to be retracted in the second cylinder.

Preferably, the further advance of the first piston will cause the dough in the second cylinder to be compressed to remove any air or other gases.

Preferably, as the first cylinder swings downwardly from the second position, a peripheral cutting lip, eg., of neoprene or other resilient material, on the sleeve, will cut the dough remaining in the first cylinder from the preset quantity of dough in the second cylinder, and the first piston may be advanced to eject this remaining dough from the first cylinder into the mixer bowl.

Preferably, when the second piston is advanced to eject the pre-set quantity of dough from the second cylinder, the dough is ejected onto a lifting tray mounted on the top of the first cylinder.

Preferably, the lifting tray is connected to the first cylinder by a curved plate which passes in front of the second cylinder as the first cylinder is moved from the second position to the first position.

The pistons, and the sleeve, are preferably advanced and retracted hydraulically or pneumatically, although mechanical linkages may be used if preferred.

Preferably, a hydraulic or pneumatic ram moves the first cylinder between the first and second positions.

Preferably, guide means within the mixer bowl, preferably suspended from the frame, direct the dough towards the curved face of the divider body.

Preferably, sensor means, on the frame, monitor the quantity of dough in the mixer bowl.

In a modified embodiment, two or more first and second cylinder pairs may be provided to respectively divide the dough in the mixer bowl to preset quantities.

BRIEF DESCRIPTION OF THE DRAWINGS

To enable the invention to be fully understood, preferred embodiments will now be described with reference to the accompanying drawings, in which.

DETAILED DESCRIPTION OF THE PREFERRED EMBODIMENTS

Figure 1:
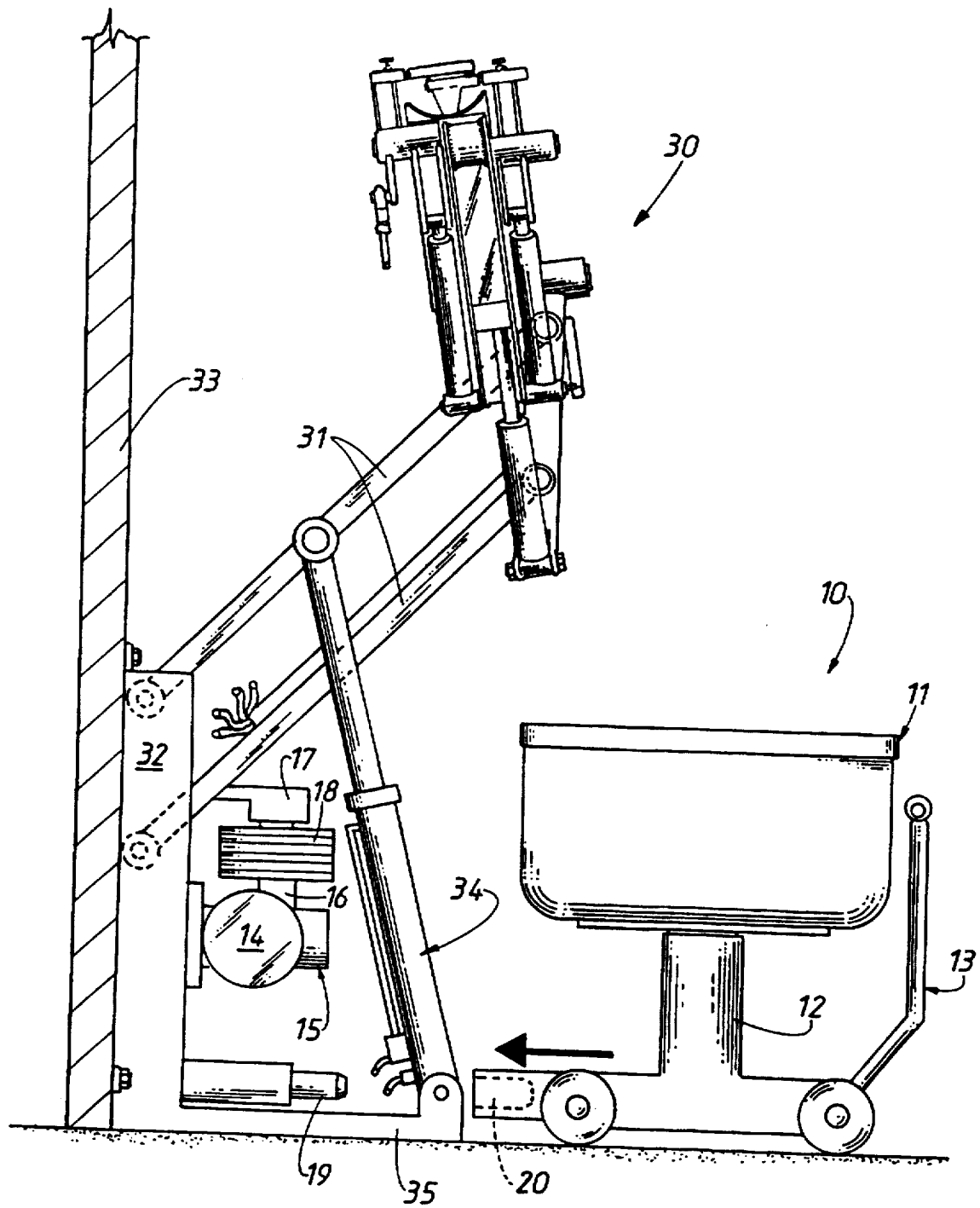
FIG. 1 is a schematic view of one embodiment of the dough divider, for use with a mixing bowl mounted on a trolley.
Figure 2:
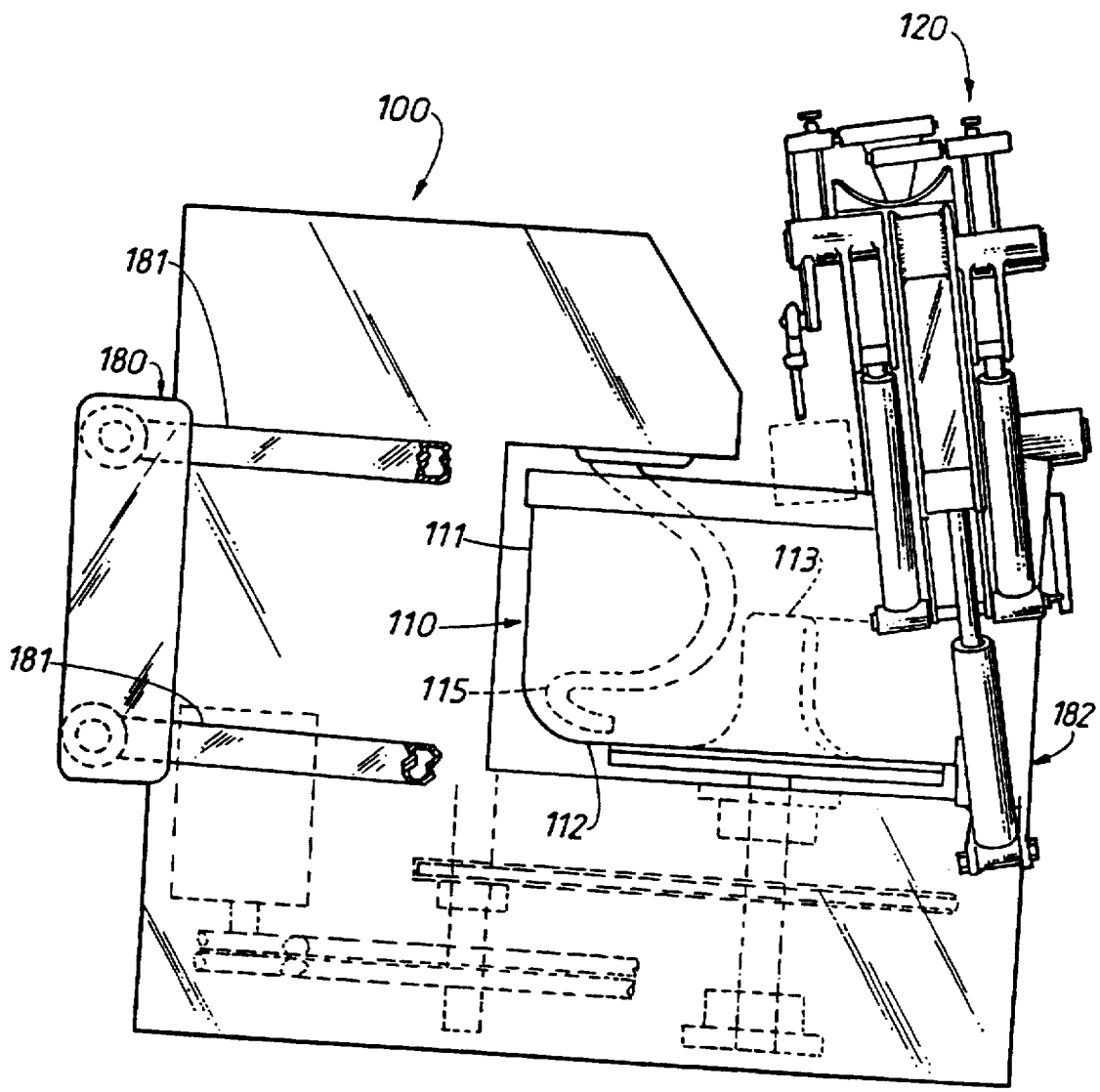
FIG. 2 is a rear elevational view of a second embodiment of the dough divider mounted on a dough mixer (parts being omitted for clarity)
Figure 3:
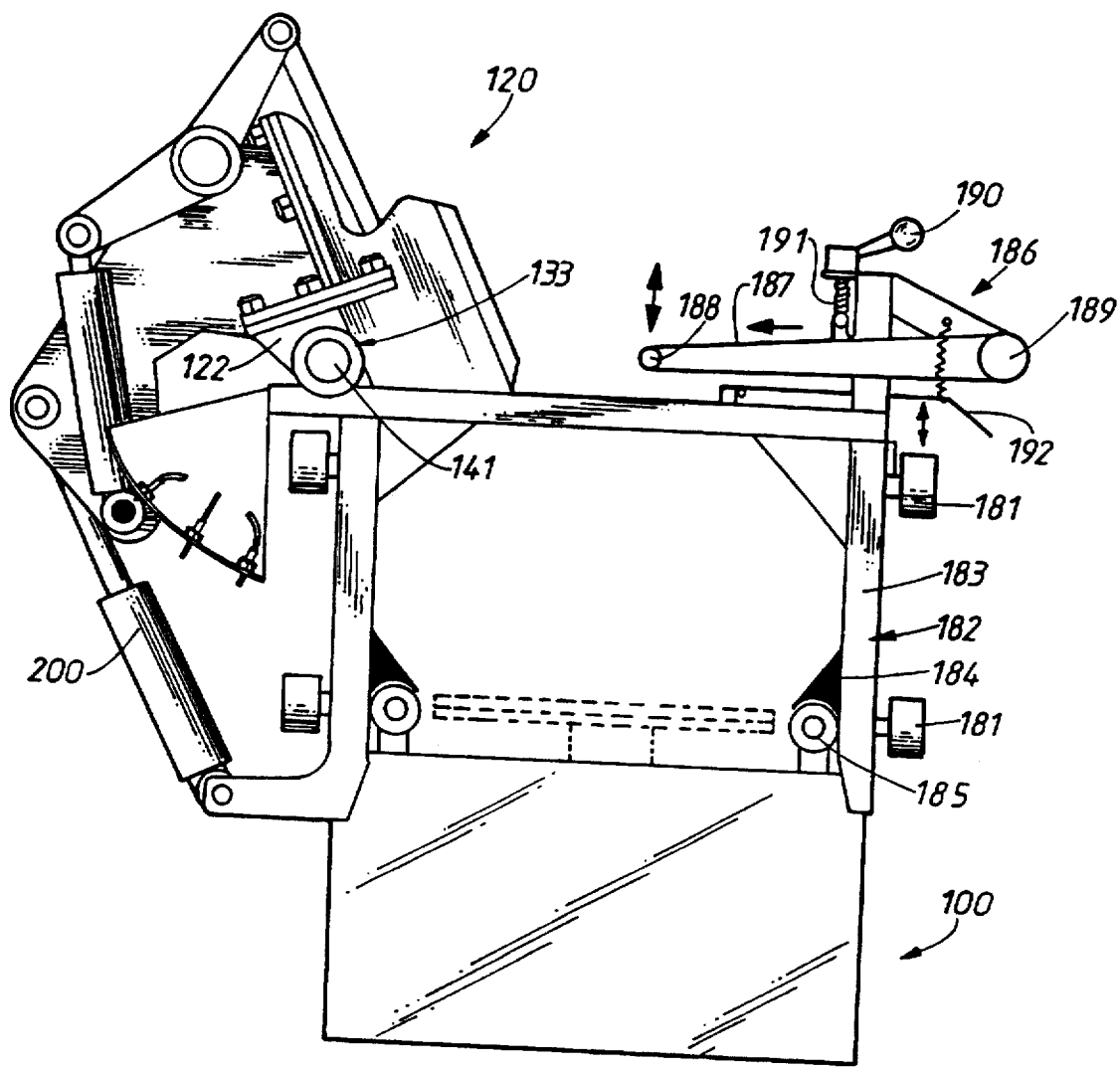
FIG. 3 is a side elevational view of the divider of FIG. 2.

Referring to FIG. 1, the mixer 10 has a mixer bowl 11 rotatably journalled on an axle (not shown) on a post 12 on a wheel supported trolley 13.

An electric drive motor 14 has a gearbox 15 (where the output shaft 16, supported by a bearing 17, has a drive roller 18, with a friction drive coating, to operably engage and rotate the mixing bowl 11. Locating pins 19 operably engage sockets 20 in the trolley 12 to accurately locate the mixing bowl 11 in driving engagement with the drive roller 18.

The dough divider 30, to be described in more detail with reference to FIGS. 2 to 16, is mounted on two pairs of parallel arms 31, in turn mounted on a support frame 32 fixed to a wall 33 of the bakery. A hydraulic ram 34 is connected to a foot 35 on the frame, and one of the arms 31, to selectively raise and lower the dough divider 30 into, and out of, the mixer bowl 11.

Referring now to the second embodiment of FIGS. 2 to 5, the mixer 100 has a mixer bowl 110 with a peripheral wall 111, an annular floor 112 and a central core 113. The mixer bowl 110 is normally rotated in the direction of arrow 114 (see FIG. 4) and the dough is mixed by a ram's horn beater 115.

The dough divider 120 has a base frame 180 mounted on the mixer 100 and two pairs of parallel arms 181 support a main frame 182, where side rails 183 have stops 184 engaged by rollers 185 on the mixer 100.

A take-off conveyor 186 is mounted on the main frame 182 and has a continuous conveyor belt 187, passing around rollers 188, 189, to receive and conveyor the divided dough pieces from the dough divider 120. A handle 190 operates a screw 191 which enables the height of the take-off conveyor 186 to be adjusted. The dough pieces are transported between the lower ram of the belt 187 and a spring-loaded plate 192, the plate 192 supporting the dough pieces as they are transported to a discharge point.

Figure 5:
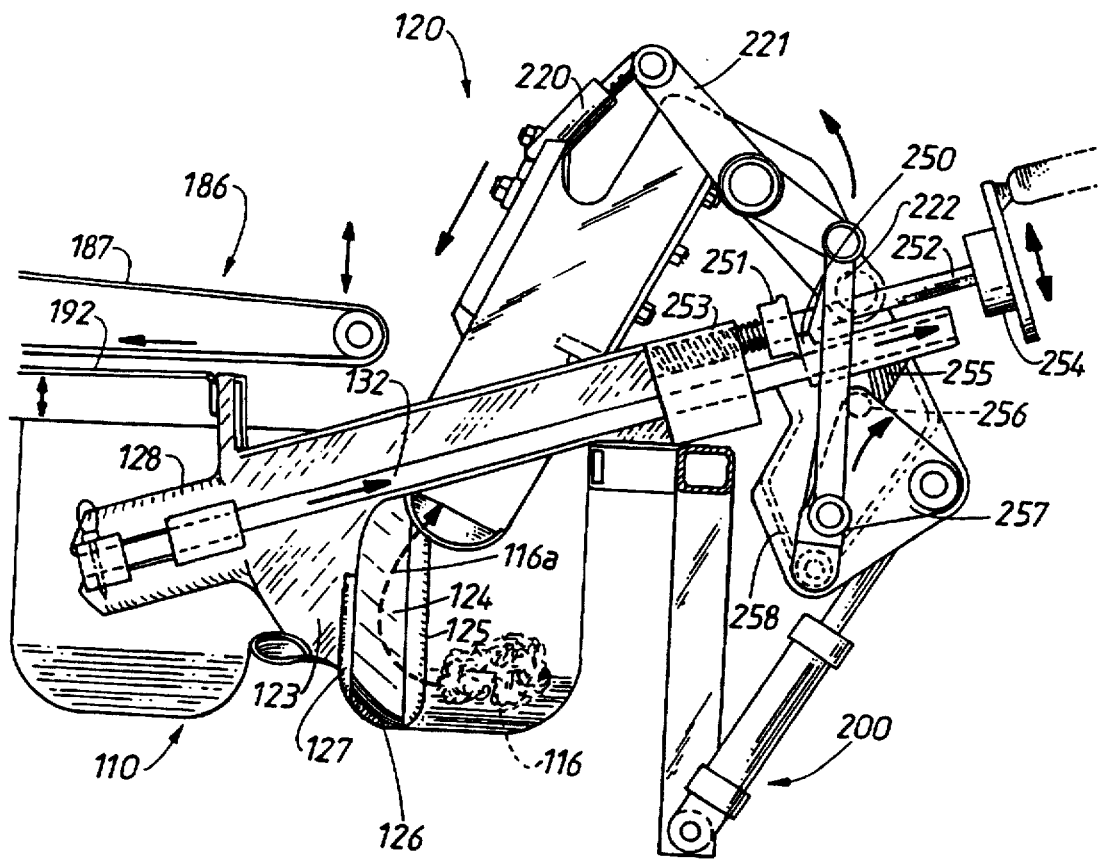
FIG. 5 is a side elevational view of the dough divider, from the opposite side to FIG. 3, taken on line 5—5 on FIG. 4.
Figure 4:
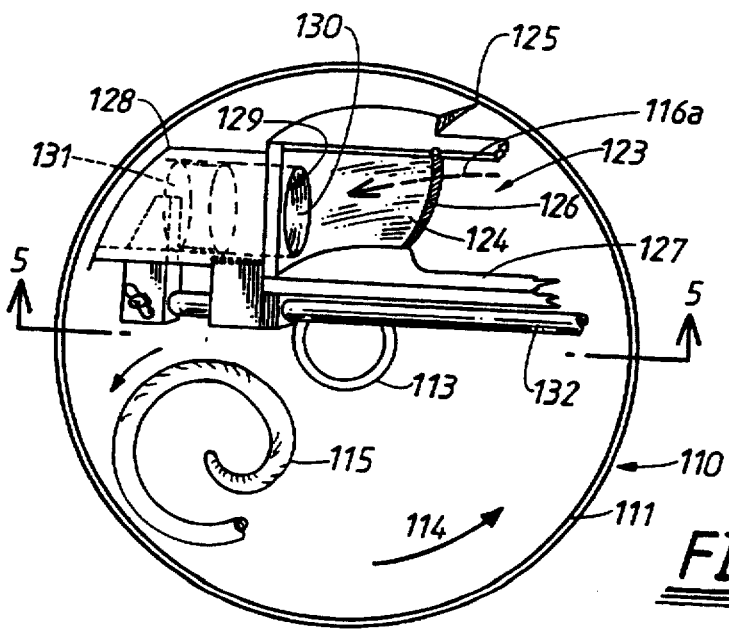
FIG. 4 is a plan view showing a portion of the dough divider and the mixing bowl.

Referring now to FIGS. 4 and 5, a divider body 123 has an upwardly-inclined curved face 124 provided with scraper edges 125, 126 and 127 which guide the dough 116 into the mouth of the divider body 23. A slight rotation of the mixer bowl 110 during the lowering of the divider body 123 into the bowl will assist in the seating of the scraping edges 125, 126, 127 and the piercing through the dough 116 by the divider body 123.

A scaling die 128 has a cylinder 129 extending rearwardly from the divider body 123 and its mouth 130 is connected to the curved face 124. A piston 131 is reciprocally mounted in the cylinder 129 and is advanced by a pull rod 132 to be hereinafter described.

A pendulum housing 140 (see FIGS. 5 to 14) is hingedly mounted via stub axles 141 in bushes 133 on side plates 122 on the main frame 182. A hydraulic ram 200 is operable to move the pendulum assembly 140 between the first position shown in FIG. 6, through an intermediate position shown in FIG. 8, to the second position shown in FIG. 10. Proximity switches A1, A2, A3, contacted by a finger 202, monitor and control the ram 200.

A cylinder 142 is provided in the housing 140 and has a semi-cylindrical extension 143 on which is mounted a curved plate 144 and a lifting tray 145. A cylindrical knife sleeve 146 is reciprocally mounted in the cylinder 142 and has a bevelled cutting edge at its forward end. A hydraulic ram 220 is mounted on the pendulum housing 140 to selectively advance and retract the knife sleeve 146 via a rocker arm 221 and connecting link 222.

A piston 148 is reciprocally mounted in the knife sleeve 146 and is selectively advanced and retracted by a hydraulic ram 240 mounted on the pendulum housing 140, via a rocker arm 241 and piston rod 242.

The operation of the divider 120 is lowered into the mixer bowl 110 with the scraping edges 125, 126 and 127 on the divider body 123 in engagement with the core 113, annular floor 123 and peripheral wall 111 of the mixer bowl 110.

Figure 6:
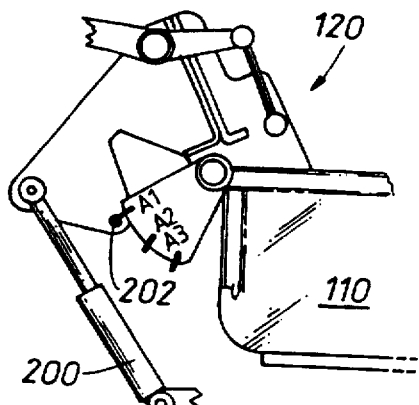
FIGS. 6 and 7 are schematic sectional side views showing step 1 of the operating sequence of the divider.
Figure 7:
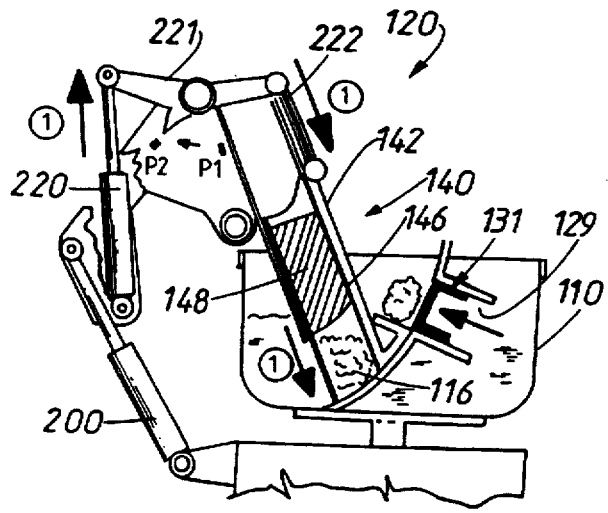
Figure 8:
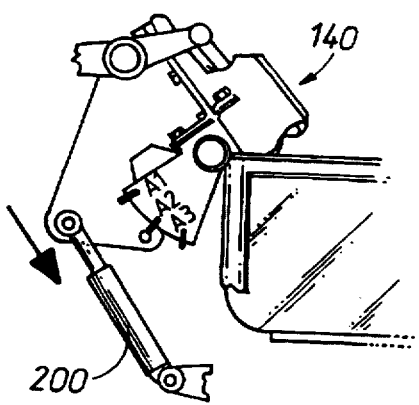
FIGS. 8 and 9 are similar views showing steps 2 and 3 of the operating sequence.
Figure 9:
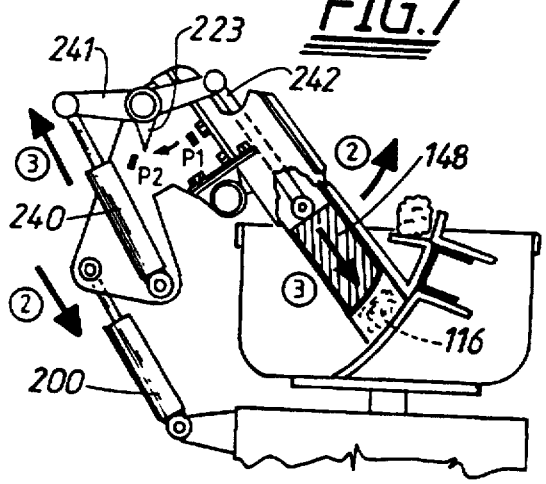

The pendulum assembly 140 is initially moved by the pendulum ram 200 so that the cylinder 142 is in the first position shown in FIGS. 6 and 7 —the finger 202 engaging proximity switch A1 —with both the knife sleeve 146 and the piston 148 being retracted. As the mixer bowl 110 is slowly rotated in the direction of arrow 114, the dough 116 will tend to move up the curved face 124 of the divider body 123, ie., in the path indicated by arrow 116a in FIGS. 4 and 5.

In the first step of the sequence (FIGS. 6 and 7), the knife sleeve 146 is advanced by ram 220 (until it engages a proximity switch K2) to cause a charge of dough to be cut from the body of the dough 116 in the mixer bowl 110.

In the second step (see FIGS. 8 and 9), pendulum ram 200 is partially retracted, until the finger 202 engages proximity switch A2, and the pendulum assembly 140 is now in an intermediate position.

Figure 15:
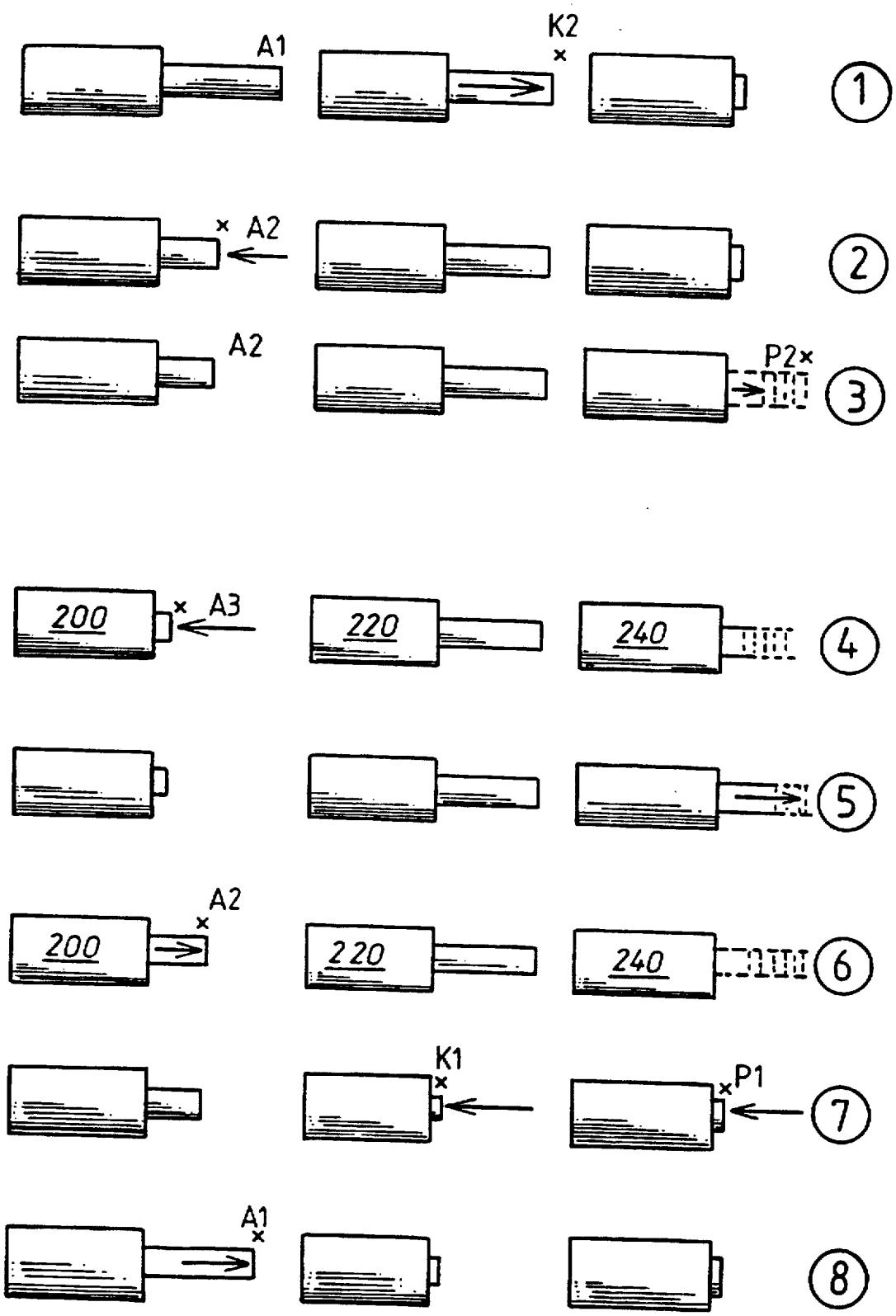
FIG. 15 is a table showing the respective movement of the rams for the pendulum assembly, knife and compression piston in steps 1 to 8, respectively, in the operating sequence.

In step 3, piston ram 240 advances the piston 148 to compress the charge of dough in the knife sleeve 146. If the finger 223 on the rocker 222 trips proximity switch P2 before the hydraulic pressure in the line to ram 240 operates a pressure switch, this indicates that the charge of dough in the knife sleeve 146 is below a preset minimum weight, eg. 700 gms. As shown in FIG. 15, ram 200 is retracted, the mixer bowl 110 is rotated to supply additional dough to the knife sleeve 146, and the piston ram 240 is then operated to test the size of the new charge of dough.

In normal operation, however, the piston ram 240 will achieve full operating pressure before the finger 223 reaches proximity switch P2 and so the charge of dough in the knife sleeve 146 equals, or exceeds, the preset minimum limit.

In step 4 (see FIGS. 10 and 11), pendulum ram 200 is retracted to cause finger 202 to trip proximity switch A3, and the pendulum assembly 140 is moved to the second position so that the knife sleeve 146 is aligned with the scaling die cylinder 129. In step 5, piston ram 240 is advanced to advance the piston 148 towards the scaling die 128 to push all (or most) of the charge of the dough into the die. The scaling die piston 131 is pushed rearwardly in the cylinder 129 until a pawl 250 on the pull rod 132 engages an adjustable stop 251. The position of the adjustable stop (see FIG. 5) is controlled by a screw-threaded shaft 252, engaged in a bearing block 253, and rotatable by a handle 254.

By increasing the distance to which the scaling piston 131 can be retracted into the scaling die cylinder 129, the volume (and thereby weight) of the dough to be divided can be increased.

In step 6 (see FIG. 12), pendulum ram 200 is extended to trip proximity switch A3), and the pendulum assembly 140 is moved to the intermediate position. It will be noted that the preset volume of dough is contained in the scaling die 128, while any excess is cut off by the "wiping action" of the knife sleeve 146 over the curved face 124.

In step 7 (see FIG. 13), both knife ram 220 and piston ram 240 are retracted to retract the knife sleeve 146 and piston 148 respectively.

In step 8 (see FIG. 14), pendulum ram 200 is further extended to move the pendulum assembly 140 to the first position to receive a fresh charge of dough as the mixing bowl 110 is rotated.

Figure 10:
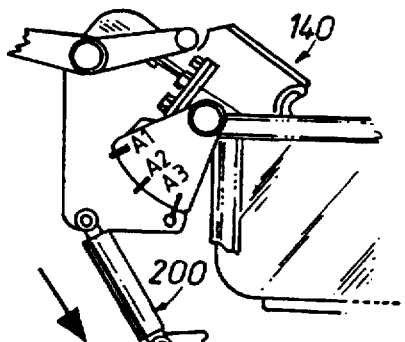
FIGS. 10 and 11 are similar views showing steps 4 and 5 of the operating sequence.
Figure 11:
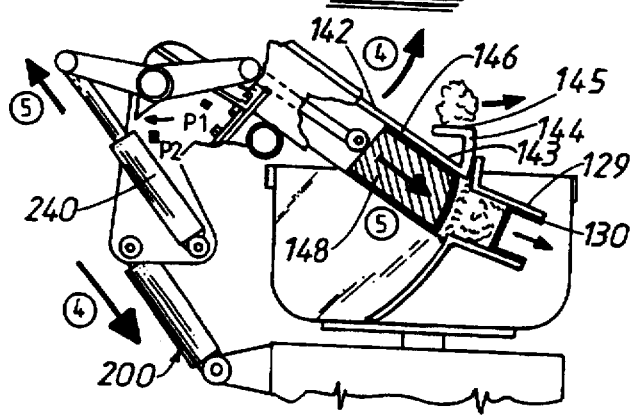
Figure 12:
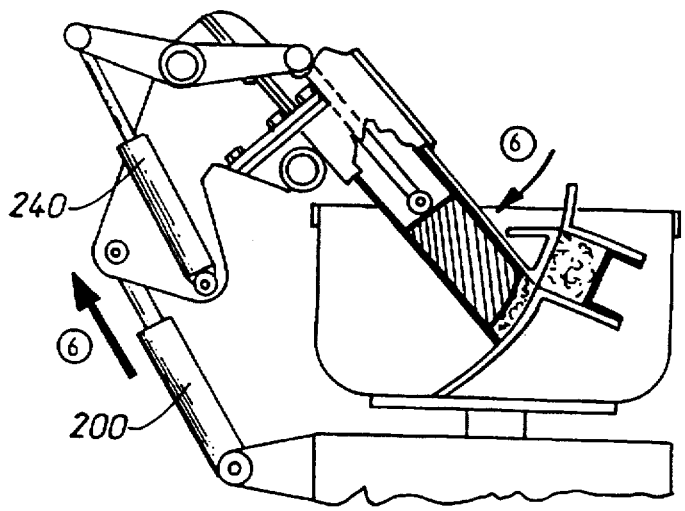
FIGS. 12 to 14 are similar views showing steps 6 to 8, respectively, of the operating sequence.
Figure 13:
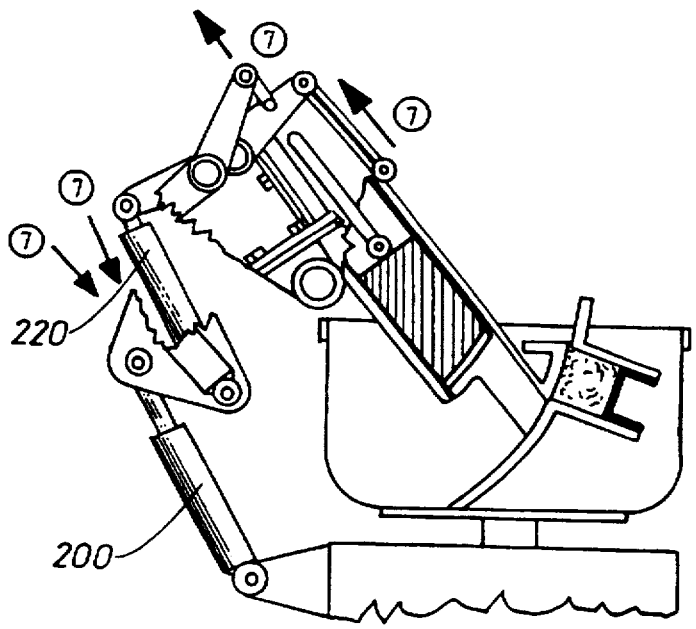
Figure 14:
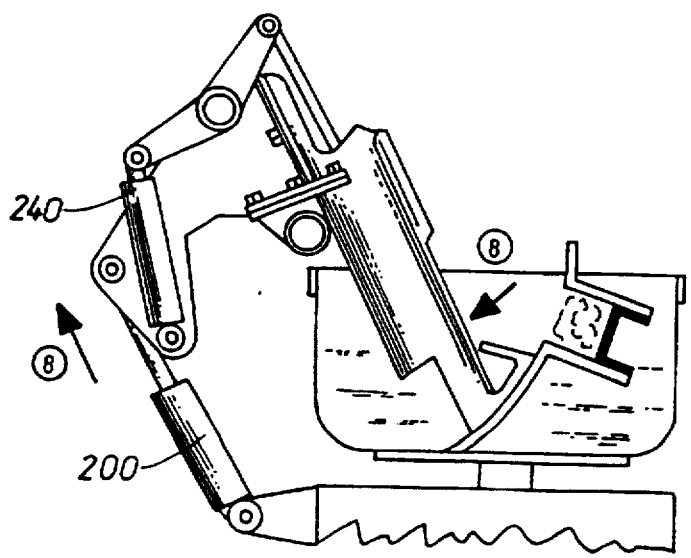

As step 1 is repeated (see FIGS. 6 and 7), the die scaling piston 131 is advanced by the pull rod 132 to deposit the divided charge of dough onto the lifting tray 145 for delivery to the take-off conveyor 186 when the pendulum assembly 140 is moved to the second position in step 4 (FIGS. 10 and 11).

The pull rod 132 is advanced to cause the scaling die piston 131 to expel the dough from the scaling die 128, by engagement of a pawl 255 on the pull rod 132 by a roller 256 on a bell crank 257, operably connected to the link 222, which connects the knife sleeve 146 to rocker arm 221 (and knife ram. 220) via a connecting plate 258 on the knife sleeve 146.

As hereinbefore described, the dividing system need not be restricted to a single pendulum assembly 140/scaling die 128 combination, but could be extended, eg., up to six such combinations.

In an alternative embodiment (not illustrated), the knife sleeve 146 may be slidably mounted on a plurality (eg. 2 or 3) parallel guide rails or bars on the pendulum housing 140. In the first position, the advance of the sleeve 146 will cut off the charge of dough from the dough in the mixer bowl 110 and the operation will be as hereinbefore described and illustrated.

Figure 16:
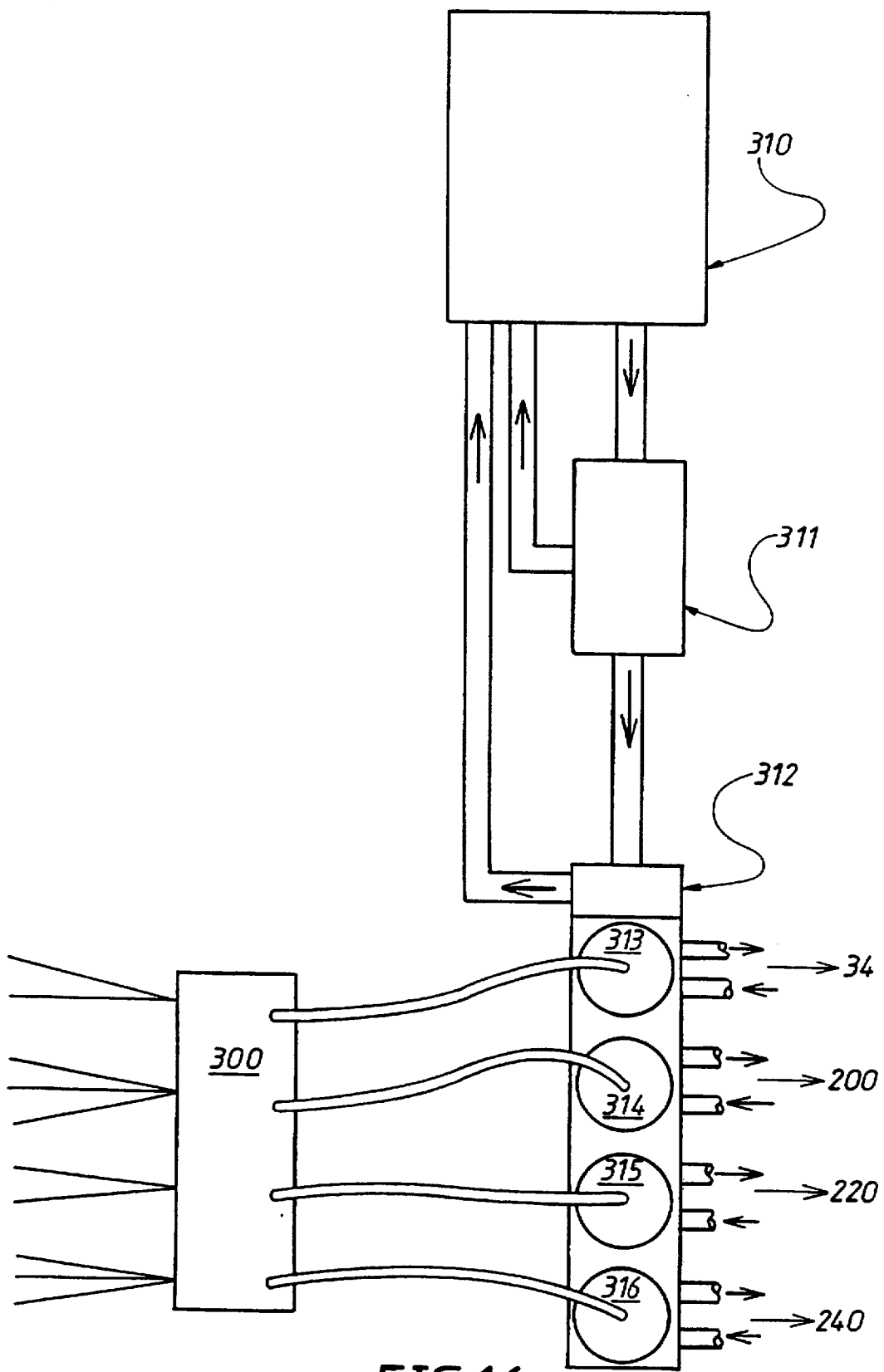
FIG. 16 is a schematic circuit diagram of the hydraulic system for the divider.

Referring now to FIG. 16, a computer unit 300 can control the sequential operation of the rams 200, 220 and 240, and the ram 34 which raises or lowers the dough divider 20, 120 relative to the mixer bowl 11, 110. Hydraulic oil is circulated via a pump 310 (with tank and filter units) through a pressure relief valve 311 to a manifold 312, where valves 313 to 316 respectively control the flow of hydraulic fluid to, or from, the rams 34, 200, 220, 240. The computer is connected to the proximity switches, and pressure switch for ram 240, to ensure that the correct operating sequence is followed.

Figure 17:
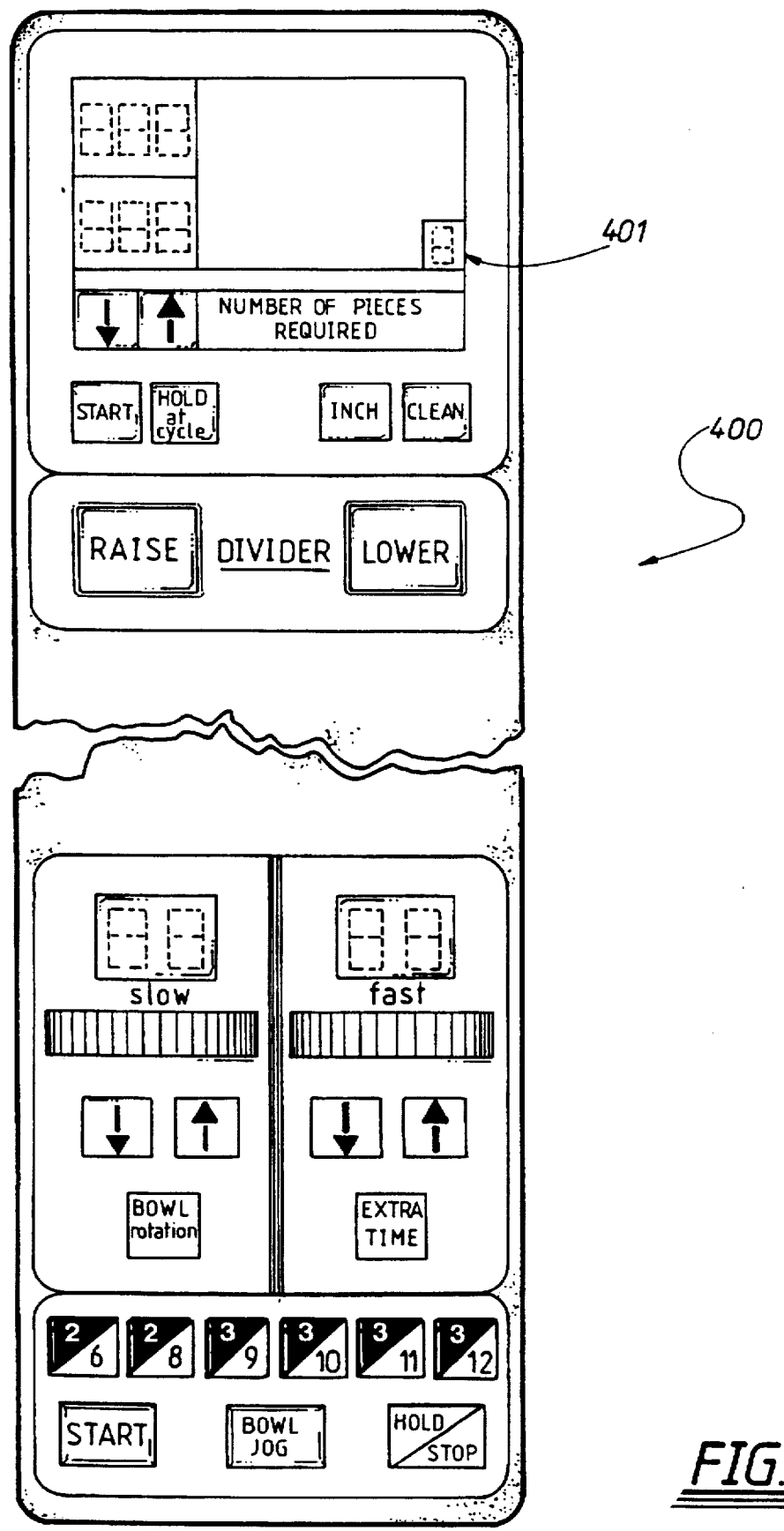
FIG. 17 is an elevational view of the control panel for the dough divider and dough mixer.

As shown in FIG. 17, a display and control panel 400 enables the operation of the divider to be monitored, and if necessary, adjusted to suit the desired conditions.

A readout 401 indicates the current step in the operating sequence of the divider.

When the weight of the charge of dough is tested at step 3 and is found not to meet the preset limit, the mixing bowl 110 can be set to mix at a higher speed to supply further dough to the divider 120.

After step 7, the piston 148 may be briefly advanced to expel any dough still within the knife sleeve 146 when the latter is retracted.

Not all types of mixers require the central raised core in the centre of the bowl. Some mixers have no core at all, where others use cores or raised portions of different shapes and dimensions in the centre of the bowl. Many types of mixers use a component widely recognised as a kneading bar and these can be in a variety of shapes and consist of vertical columns fixed to the mixer frame and does not rotate with the bowl but stays stationary at locations around the centre of the bowl.

The present invention can be incorporated in all these types of mixer designs and does not necessarily require a raised central core 13 as shown in the drawings.

The divider has the considerable advantage that a baker does not have to lift heavy slabs of dough from the mixer bowl to a separate dividing machine, but the dough is divided as it is removed from the mixer.

Various other changes and modifications may be made to the embodiments described and illustrated without departing from the present invention.

What is claimed is:

1. A dough divider comprising:
   a frame locatable adjacent a mixing bowl of a dough mixer;
   a first cylinder, hingedly mounted on the frame, for movement between a first position and a second position;
   a reciprocating sleeve or tube in the first cylinder;
   a first reciprocating piston in the sleeve or tube;
   a divider body on the frame, extendable into at least a portion of the mixer bowl, having a curved face engageable with dough in the mixer bowl;
   a second cylinder in the divider body, operably connected to the curved face; and
   a second reciprocating piston in the second cylinder, so arranged that:
   in the first position, the first piston and the sleeve or tube are retracted and the sleeve or tube receives a charge of dough from the curved face of the divider body as the mixing bowl rotates;
   the sleeve or tube is advanced to cut the charge of dough from the remainder of the dough in the mixing bowl;
   the first cylinder is moved to the second position and the charge of dough is transferred to the second cylinder by advancing the first piston;
   a pre-set quantity of dough remains in the second cylinder as the first cylinder returns to its first position; and
   the pre-set quantity of dough is ejected from the second cylinder by advancing the second piston.

2. A dough divider comprising:
   a frame locatable adjacent a mixing bowl of a dough mixer;
   a sub-frame or housing hingedly mounted on the frame, for movement between a first position and a second position;
   a reciprocating sleeve or tube mounted in or on guide means in or on the sub-frame or housing;
   a first reciprocating piston in the sleeve or tube;
   a divider body on the frame, extendable into at least a portion of the mixer bowl, having a curved face engageable with dough in the mixer bowl;
   a second cylinder in the divider body, connected to the curved face; and
   a second reciprocating piston in the second cylinder, so arranged that:
   in the first position of the sub-frame or housing, the first piston and the sleeve or tube are retracted and the sleeve or tube receives a charge of dough from the curved face of the divider body as the mixing bowl rotates;
   the sleeve or tube is advanced to cut the charge of dough from the remainder of the dough in the mixing bowl;
   the sub-frame or housing is moved to the second position and the charge of dough is transferred to the second cylinder by advancing the first piston;
   a pre-set quantity of dough remains in the second cylinder as the sub-frame or housing returns to its first position; and
   the pre-set quantity of dough is ejected from the second cylinder by advancing the second piston.

3. A dough divider as claimed in claim 1 further comprising:
   guide means comprising bars, or rails, and the first cylinder guides the sleeve or tube as it is advanced and retracted relative to the divider body.

4. A dough divider as claimed in claim 1 wherein:
   the frame is mounted above the mixer bowl and is raised vertically; swung to one side of the mixer bowl; or swung upwardly and rearwardly of the mixer bowl.

5. A dough divider as claimed in claim 1 wherein:
   as the first cylinder returns to the first position, a further charge of dough is drawn into the first cylinder by retraction of the first piston and the sleeve or tube.

6. A dough divider as claimed in claim 1 wherein:
   in the second position, the first cylinder will be aligned with the second cylinder and the advance of the first piston will transfer a quantity of dough from the first cylinder to the second cylinder causing the second piston to be retracted in the second cylinder; and
   further advance of the first piston will cause the dough in the second cylinder to be compressed to remove any air or other gases.

7. A dough divider as claimed in claim 6 wherein:
   as the first cylinder swings downwardly from the second position, a peripheral cutting lip on the sleeve will cut the dough remaining in the first cylinder from the preset quantity of dough in the second cylinder, and the first piston is advanced to eject this remaining dough from the first cylinder into the mixing bowl.

8. A dough divider as claimed in claim 7 wherein:
   when the second piston is advanced to eject the pre-set quantity of dough from the second cylinder, the dough is ejected onto a lifting tray mounted on the top of the first cylinder, the lifting tray being connected to the first cylinder by a curved plate which passes in front of the second cylinder as the first cylinder is moved from the second position to the first position.

9. A dough divider as claimed in claim 1 wherein:
   the pistons, and the sleeve, are advanced and retracted hydraulically, pneumatically and/or mechanically, a hydraulic or pneumatic ram optionally moving the first cylinder between the first and second pistons.

10. A dough divider as claimed in claim 1 wherein:
    guide means within the mixer bowl, suspended from the frame, direct the dough towards the curved face of the divider body; and
    sensor means, on the frame, monitor the quantity of dough in the mixer bowl.

11. A dough divider as claimed in claim 1 wherein:
    two or more first and second cylinder pairs are provided to respectively divide the dough in the mixer bowl into pre-set quantities.

12. A dough divider as claimed in claim 1 wherein:

the first cylinder is movable to an intermediate position between the first and second positions, and the first piston is advanced to compress the charge of dough, where a pre-set minimum weight of dough in the charge of dough is indicated by a pressure switch measuring a pre-set pressure on the first piston before the first piston engages a proximity switch.

13. A dough divider as claimed in claim 1 wherein:

travel of the second piston in the second cylinder controls the weight of the dough divided, the travel being adjustable to enable the weight of dough divided to be varied.

14. A dough divider as claimed in claim 2 wherein;

the guide means comprises bars, rails, and wherein said sub-frame or housing is a first cylinder to guide the sleeve or tube as it is advanced and retracted relative to the divider body.

15. A dough divider as claimed in claim 2 wherein:

the frame is mounted above the mixer bowl and is raised vertically; swung to one side of the mixer bowl; or swung upwardly and rearwardly of the mixer bowl.

16. A dough divider as claimed in claim 2 wherein said sub-frame or housing is a first cylinder and as the first cylinder returns to the first position, a further charge of dough is drawn into the first cylinder by retraction of the first piston and the sleeve or tube.

17. A dough divider as claimed in claim 2 wherein said sub-frame or housing is a first cylinder and in the second position, the first cylinder will be aligned with the second cylinder and the advance of the first piston will transfer a quantity of dough from the first cylinder to the second cylinder causing the second piston to be retracted in the second cylinder; and further advance of the first piston will cause the dough in the second cylinder to be compressed to remove any air or other gases.

18. A dough divider as claimed in claim 17 wherein:

as the first cylinder swings downwardly from the second position, a peripheral cutting lip on the sleeve will cut the dough remaining in the first cylinder from the present quantity of dough in the second cylinder, and the first piston is advanced to eject this remaining dough from the first cylinder into the mixing bowl.

19. A dough divider as claimed in claim 18 wherein:

when the second piston is advanced to eject the pre-set quantity of dough from the second cylinder, the dough is ejected onto a lifting tray mounted on the top of the first cylinder, the lifting tray being connected to the first cylinder by a curved plate which passes in front of the second cylinder as the first cylinder is moved from the second position to the first position.

20. A dough divider as claimed in claim 2 wherein said sub-frame or housing is a first cylinder and the pistons, and the sleeve, are advanced and retracted hydraulically, pneumatically and/or mechanically, a hydraulic or pneumatic ram optionally moving the first cylinder between the first and second pistons.

21. A dough divider as claimed in claim 2 wherein:

a second guide means within the mixer bowl, suspended from the frame, directs the dough towards the curved face of the divider body; and sensor means, on the frame, monitors the quantity of dough in the mixer bowl.

22. A dough divider as claimed in claim 2 wherein said sub-frame or housing is a first cylinder and two or more first and second cylinder pairs are provided to respectively divide the dough in the mixer bowl into pre-set quantities.

23. A dough divider as claimed in claim 2 wherein said sub-frame or housing is a first cylinder and the first cylinder is movable to an intermediate position between the first and second positions, and the first piston is advanced to compress the charge of dough, where a pre-set minimum weight of dough in the charge of dough is indicated by a pressure switch measuring a pre-set pressure on the first piston before the first piston engages a proximity switch.

24. A dough divider as claimed in claim 2 wherein:

a travel of the second piston in the second cylinder controls the weight of the dough divided, the travel being adjustable to enable the weight of dough divided to be varied.

* * * * *